March 24, 1970

D. D. ROBERTSON 3,502,269

AUTOMATIC DISTRIBUTOR VALVE MECHANISM
FOR LAWN SPRINKLING SYSTEMS

Filed Sept. 8, 1967

INVENTOR.
Duane D. Robertson
BY
Ralph F. Crandell
ATTORNEY

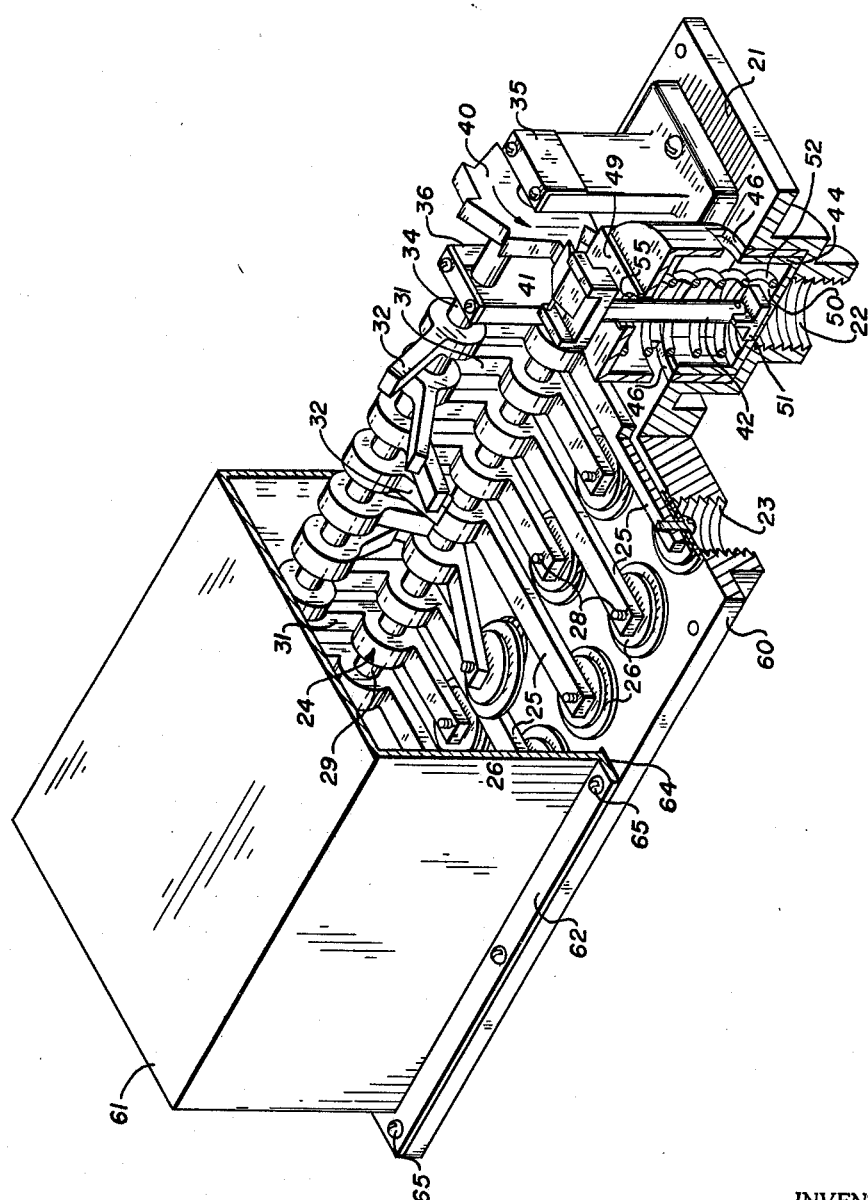

INVENTOR.
Duane D. Robertson
BY
Ralph F. Crandell
ATTORNEY

United States Patent Office 3,502,269
Patented Mar. 24, 1970

3,502,269
AUTOMATIC DISTRIBUTOR VALVE MECHANISM FOR LAWN SPRINKLING SYSTEMS
Duane D. Robertson, 1922 Del Mar Parkway, Aurora, Colo. 80910
Filed Sept. 8, 1967, Ser. No. 666,288
Int. Cl. A01g 27/00, 25/00
U.S. Cl. 239—66    2 Claims

ABSTRACT OF THE DISCLOSURE

The described self-contained sealed distributor valve arrangement includes a plurality of valves actuated by cams operated by a ratchet mechanism. A timer in the sprinkling system actuates a solenoid valve to momentarily shut off water pressure to the distributor valve thereby actuating the ratchet mechanism. Periodic closing and opening of the water line by the timer results in sequential operation of the distributor valve mechanism to direct water to groups of sprinkler heads.

BACKGROUND OF THE INVENTION

Field of the invention

The present invention relates to lawn sprinkling systems and more particularly to an automatic distributor valve mechaninm for use in a lawn sprinkling sytem so that the system automatically, and in timed sequence, irrigates different portions of the lawn in which it is installed.

Description of the prior art

Lawn sprinkling systems in which sprinkling heads or nozzles are positioned at regularly spaced intervals throughout a lawn area and are supplied with water to irrigate the lawn, are widely known and used, particularly for larger lawn areas. As pointed out in United States Patent No. 1,606,245, issued Nov. 9, 1926, to Everett P. Lang, the sprinkling nozzles are conventionally arranged in groups of a given number of heads as determined by the size of the lawn area and capacity of the water supply system. In the Lang system, each group of sprinkler heads is supplied by an individual supply pipe leading from the main water line.

As described in the patent to Lang, and also in U.S. Patent 3,118,606, issued Jan. 21, 1964, to Orlo Rotunda, various groups of sprinkler heads may be supplied with water in succession by the use of timed valve devices. The patent to Rotunda describes a system in which each supply line to a set of sprinkler heads is provided with its own timer controlled solenoid valve.

A distributor valve for a lawn sprinkling system is disclosed in U.S. Patent No. 3,027,094, issued Mar. 27, 1962, to W. J. Phillips. The distributor valve embodies a cylindrical housing with an inlet line and a plurality of outlet lines arranged in a circle extending therefrom. A valve member which rotates to distribute water successively to each outlet line is enclosed in the housing. The main water line is controlled by a timer-operated solenoid valve which momentarily closes and then opens the main water line. This momentary opening and closing of the water line actuates the distributor valve to sequentially supply water to a given outlet line and the particular set of heads associated therewith. The rotary valve and actuator therefor as disclosed by Phillips, requires a sliding or rotary seal to prevent water leakage.

OBJECTS OF THE PRESENT INVENTION

The principal object of the present invention is to provide an improved automatic distributor valve mechanism for lawn sprinkling systems which includes positive opening and closing of the water control valves and eliminates the requirement for sliding or rotating seals, thereby substantially simplifying maintenance of the valve, reducing the cost of manufacture and installation of the valve, and increasing the life of the unit.

Another object of the present invention is to provide a unit of the foregoing character which is operative in any position of installation, may be located inside or outside of a building or other structure, is completely sealed so that it may be buried in the lawn in which the system is located and which is simple, yet completely reliable in operation.

SUMMARY OF THE INVENTION

The invention herein described resides in a unique distributor valve for a lawn sprinkling system. In summary, the distributor valve described herein comprises a sealed chamber having a water inlet port and a plurality of water outlet ports, the latter being controlled by disc valves which seal against valve seats in a valve block. The valves are sequentially operated by cams fixed on a cam shaft. The shaft is rotated by a ratchet mechanism operated by the action of water pressure in the inlet line on a piston and cylinder mechanism. The water system includes a timer controlled solenoid valve in the main water line operative to shut off momentarily and then turn on the water supply to the distributor valve. The latter, together with the piston driven, ratchet operated, cam mechanism, is completely sealed with all operating parts housed within the water chamber. The housing seal and each of the valve seals are static seals so that there is no sliding or rotating movement between the parts. No seal is required for the cam operating piston and cylinder mechanism, which operates in response to the flow of water in the water inlet line.

BRIEF DESCRIPTION OF THE DRAWINGS

FIGURE 2 is an isometric view, with parts cut away for clarity, of an automatic distributor valve mechanism embodying the present invention.

DESCRIPTION OF THE PREFERRED EMBODIMENT

Figure 1:
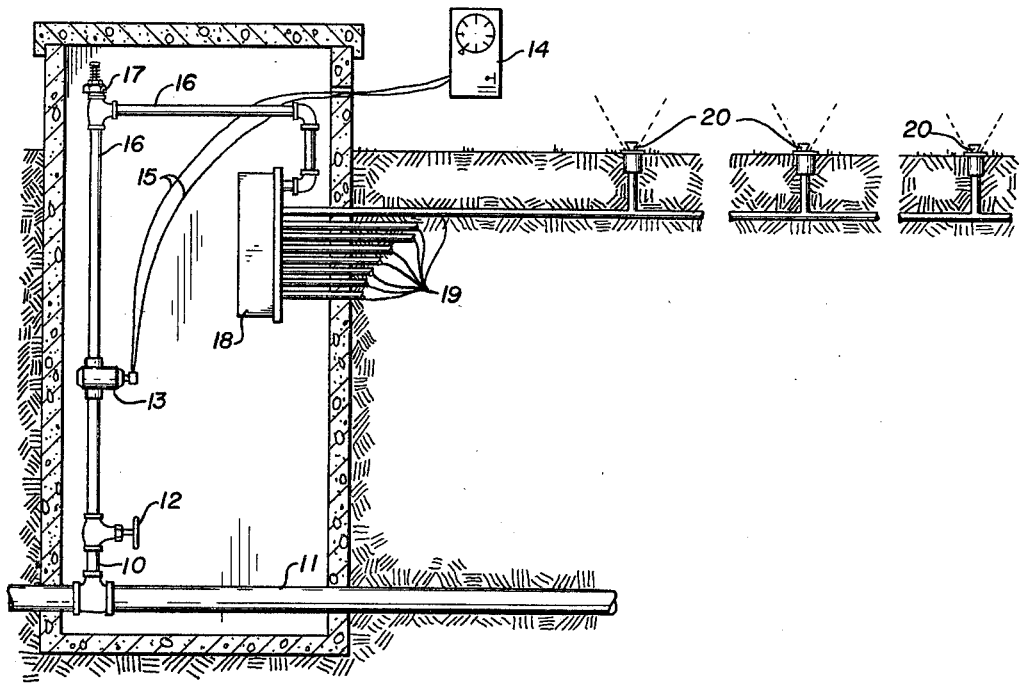
FIGURE 1 is a schematic representation of a lawn sprinkling system, including a distributor valve mechanism embodying the present invention.
Figure 5:
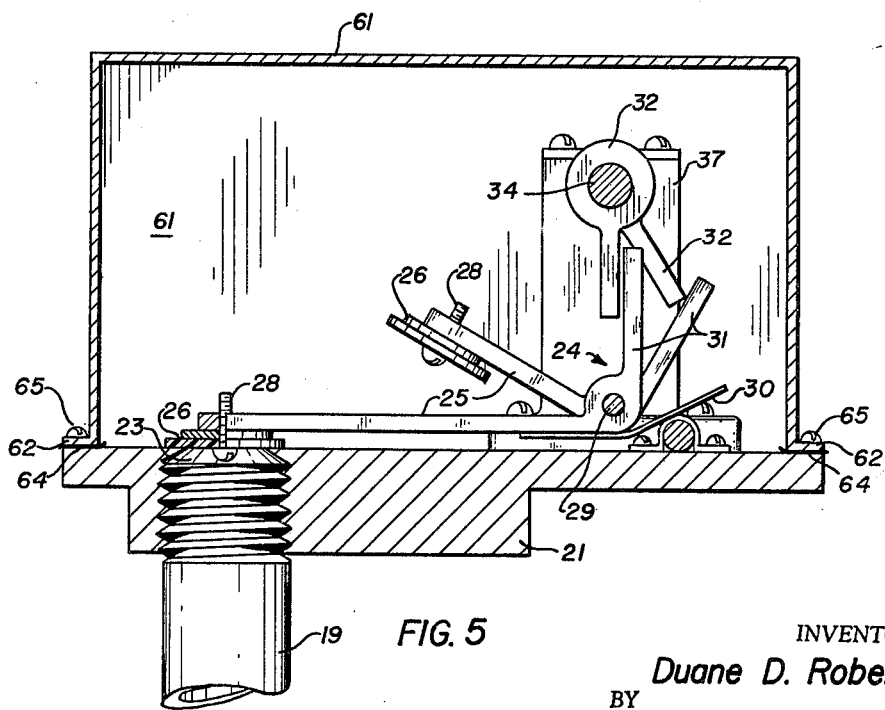
FIGURE 5 is a section view taken substantially in the plane of line 5—5 on FIGURE 3.
Figure 3:
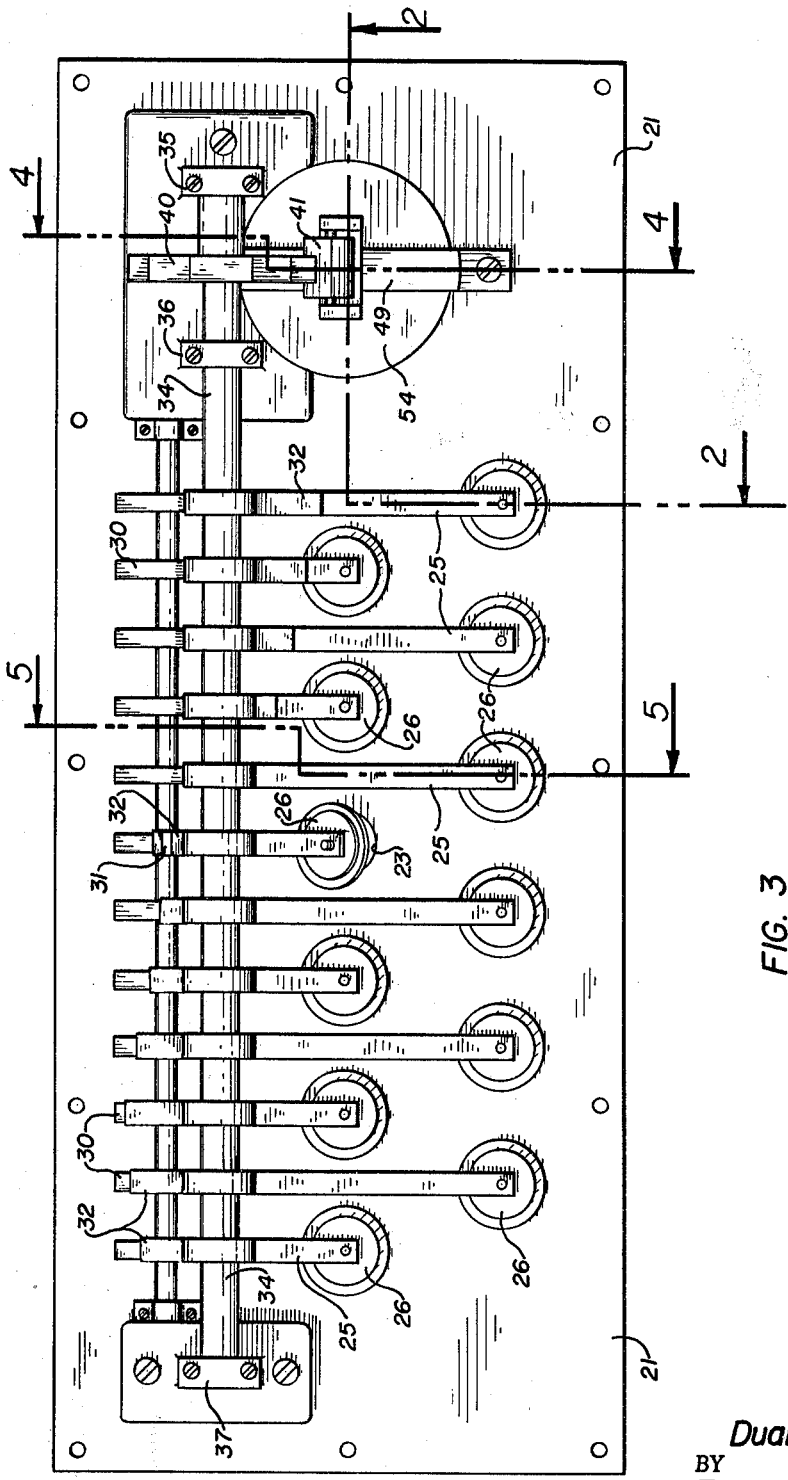
FIGURE 3 is a plan view of the mechanism shown in FIG. 2, with the housing cover broken away to expose the internal valve mechanism.
Figure 4:
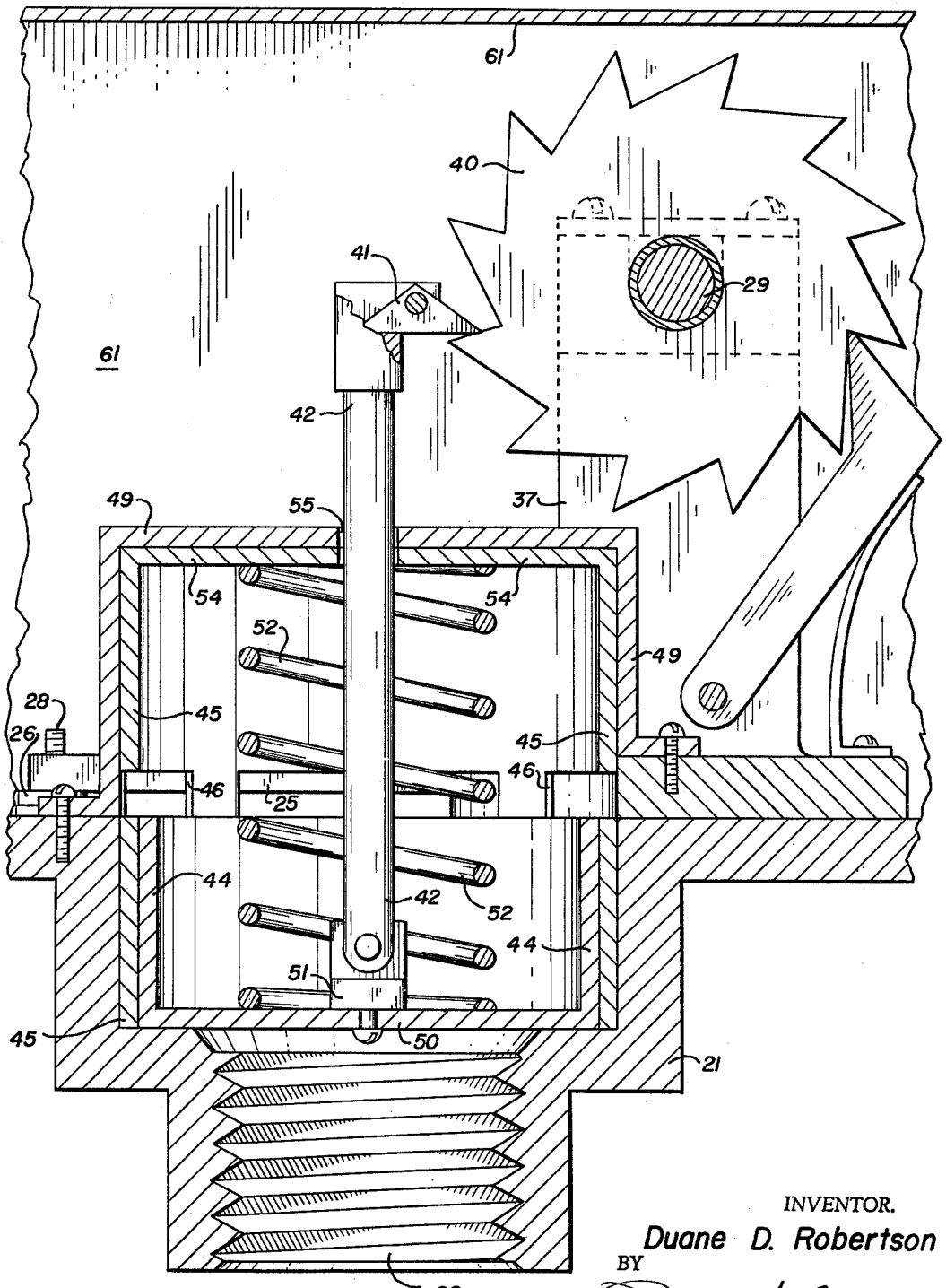
FIGURE 4 is a section view taken substantially in the plane of line 4—4 of FIGURE 3.

FIGURE 1 shows a lawn sprinkling system embodying the present invention. The system includes a water supply line 10, leading from a water source, such as a water main 11, to a manual shut-off valve 12, and a solenoid operated shut-off valve 13, under the control of a timer 14. The solenoid valve 13 is conveniently located, together with the shut-off valve 12, in a pit adjacent the water main 11 and below frost level so that the line 10 and valves will not freeze. The timer 14 may be located in an adjacent house or other protected place and connected to the solenoid valve 13 by appropriate electrical lines 15.

From the solenoid valve 13, a water input line 16, which includes a conventional vacuum breaker 17, leads to a distributor valve 18 embodying the present invention. Connected to the distributor valve 18 are a plurality of outlet supply lines 19 which lead to various groups of sprinkler heads 20, one illustrative group of sprinkler heads 20 being shown in FIGURE 1. The sprinkler heads 20 are distributed in groups throughout the lawn area to be irrigated and the number of heads in each group are determined by the area to be irrigated and the water pressure available. The shut-off valve 12, solenoid valve 13, timer 14, vacuum breaker 18, and sprinkler heads 20, are of conventional construction as are the various pipes, fittings, and other components ordinarily utilized in a sprinkling system, and all may be purchased commercially. The present invention resides in the unique distributor valve 18.

In the operation of the system as shown in FIGURE 1 including the automatic distributor valve 18 embodying the present invention, with the main valve 12 open, the timer 14 periodically closes the solenoid valve 13 for a momentary period and then opens it. Such momentary closing and opening of the solenoid valve 13 actuates the automatic distributor valve to shift the flow of water from one group of sprinkler heads 20 to the next. The timer may be programmed for any desired sequence, and may be constructed to complete a cycle and then stop until either manually started or automatically started by a separate element of the timer system. The timer is desirably adjustable in order to provide for the flow of water to groups of the sprinkler heads for a sufficient period of time to provide the appropriate amount of irrigation. The timer may also be set up to start and stop automatically on daily or weekly cycles, all as is well known and described in the prior art.

The Automatic Distributor Valve Mechanism 18 embodying the present invention is shown in detail in FIGURES 2 through 5 inclusive. This distributor valve 18 comprises a base 21, which is generally rectangular in shape, and is formed of metal, plastic or other suitable rigid material of nature and thickness adapted to define ports having internal threads therein. The ports as defined in the base consist of a water inlet port 22 and a plurality of water outlet ports 23. The inlet port 22 is defined by a downwardly extending boss having internal threads therein adapted to secure the port to the main water line 16. The various outlet ports 23 are connected, also by suitable threaded connections, to the plurality of outlet lines 19, each of which lines leads to a group of sprinkler heads 20. It will be observed that the various outlet ports 23 are aligned in a longitudinal array and all extend from one side of the base so that installation of the various outlet lines 19 and groups of sprinkler heads 20 is substantially facilitated. For example, it will be appreciated by those skilled in the installation of sprinkler systems that it is desirable to have the valve outlet lines longitudinally aligned so that the distributor valve may be located adjacent a building foundation, sidewalk or in other locations such that the outlet lines may be run in the most direct manner without interfering with each other.

The number of valve openings 23 in the base plate 21 determines the number of groups of sprinkler heads which may be controlled. It is thus possible to manufacture distributor valves embodying this invention with various numbers of ports, by making only minimal changes to shorten or increase the length of the unit. In this way, manufacturing costs in producing different size valve units are substantially reduced.

The base of the distributor valve mechanism includes a peripheral flange 60 to which is sealingly secured a housing enclosure 61 having a corresponding mating peripheral flange 62. With the base, the housing defines a sealed rectangular enclosure within which is positioned the mechanism for operating the distributor valve. The flanges of the housing and base are secured together with an appropriate intermediate gasket or other sealing means 64 by means of appropriate screws or other fastening devices 65. Those skilled in the art will appreciate that any suitable sealing device may be utilized, the purpose of which is to provide a watertight seal capable of withstanding the internal water pressures created by the water system. As sealed, the distributor valve may be buried in the ground or mounted on the side of a building or positioned in any other suitable location from which the various water lines 19 may extend to the sprinkler head groups 20.

The opening or closing of each of the valve openings 23 is controlled by a valve operator indicated generally at 24. Each valve operator 24 includes a valve arm 25 extending generally parallel to the base 21 and carrying at its outer extremity a valve cap or closure 26 formed of stiffly resilient material, and secured to the arm 25 by means of an appropriate screw 28 or other fastener. The cap 26 should be sufficiently resilient to insure an effective static seal against the upper surface of the plate 21 surrounding the corresponding valve opening 23. Each valve operator 24 is pivoted intermediate its ends on a fixed shaft 29 and is urged into valve closing position by means of a leaf spring 30 or other appropriate biasing device. The spring 30 acts to urge the valve arm 25 downwardly thereby to sealingly position the valve cap 26 against the surface of the base 21 surrounding the corresponding opening 23. For purposes of lifting the valve arm 25 to open a selected port 23, the valve operator 24 includes a cam arm 31 fixed to the valve arm 25 and extending upwardly and approximately at right angles therefrom. The cam arm 31 of each valve operator 24 is adapted to be engaged by a corresponding cam 32 fixed on a rotatably mounted cam shaft 34. The cam shaft 34 is journaled for rotation in spaced journal supports 35, 36, and 37 upstanding from and secured to the base plate 21 in spaced relation thereon. By adjusting the radial position of the cams 32 with respect to each other, the cam shaft may be rotated to actuate each of the valve operators 24 in sequence and thereby successively open or close the various ports 23 in the plate 21. Water thus flows through the housing and out of the open port to the selected group of sprinkler heads.

In order to rotate the cam shaft 34 in a step-by-step manner, the cam shaft 34 has fixed thereto a ratchet wheel 40 positioned between two of the journal supports 35 and 36. The ratchet wheel 40, having a plurality of peripheral teeth, is fixed to the cam shaft so that when a tooth is engaged by a ratchet dog 41 the ratchet wheel and thereby the cam shaft is rotated one step, causing a cam 32 which is in contact with a valve arm 31 to slip past that arm and allow the associated valve 26 to close. At the same time, the next cam engages the arm of the next valve to open that valve and direct the water to a different group of sprinkler heads.

The ratchet dog 41 is moved in a vertical path by means of a piston and cylinder drive mechanism operated under the influence of the water flowing through the distributor valve. For this purpose the ratchet dog 41, is pivotally mounted on the free end of a piston rod 42 secured to a piston 44 slideably housed within a cylinder housing 45, opening into the main water inlet port 22. The cylinder housing 45 comprises an inverted, cup-shaped member having peripheral slots or openings 46 defined midway on its sides. The cylinder housing 45 is inverted into a cup-shaped depression 48 defined in the valve base 20 surrounding the inlet port 22, and is held therein by means of an appropriate clamping strap 49. When the cylinder is open, water flows through the inlet port 22 into the interior of the cylinder 45 and thence outwardly into the valve housing through the cylinder ports 46. From the housing, the water flows outwardly through an open valve to a group of sprinkler heads 20. The piston 44 is slideably mounted within the cylinder 45 and comprises an upwardly directed cup-shaped member having a piston surface 50 exposed to the water inlet opening 22. Fixed internally of the piston is a mounting block 51 to which the piston rod 42 is pivotally secured. The piston is approximately one-half of the depth of the cylinder so that, when fully raised, the cylinder ports 46 are opened. To urge the piston 44 downwardly to close the cylinder ports 46, there is provided a spring 52 acting between the piston face wall 50 and the upper wall 54 of the cylinder 45. The piston rod itself extends upwardly and outwardly through an opening 55 provided in the upper cylinder wall 54.

As thus constructed, the piston 44 slides up and down in the cylinder 45 under the influence of water pressure and the flow of water through the inlet port into the main valve housing. The spring 52 acts to urge the piston downwardly in the cylinder when the water pressure and flow in the inlet line 16 is shut off by the solenoid valve 13. Accordingly, when the solenoid valve 13 is closed, water ceases to flow through the distributor valve and the water pressure in the housing drops because the water chamber is opened to one of the distributor lines 19 and sprinkler heads 20. Upon this drop in pressure and flow, the spring 52 urges the piston 44 downwardly. During the further downward movement of the piston 44 into the cylinder 45, water leaks past the piston to allow the piston to telescope fully into the cylinder and displace the water remaining therein when the solenoid valve 13 is closed. Upon this spring biased downward movement of the piston, the dog 41 engages a tooth on the ratchet wheel 40 and rotates the cam shaft 34 one step. This changes the distribution of water from one group of heads to another. After a momentary delay, effected by the timer 14, the solenoid valve 13 opens, water pressure acts on the face 50 of the piston 44 forcing the piston upwardly and the water flows out through the cylinder ports 46. The flow of water holds the piston 44 in its uppermost position until the timer 14 again operates to close the solenoid valve 13 and the cycle is repeated. During the upward movement of the piston 44 the dog 41, being pivoted, rides over a ratchet tooth and into position for the next step in the operation. During upward movement of the piston 44, water behind the piston escapes through the piston rod opening 55 in the top wall 54 of the cylinder 45. The pressure in the valve housing being low, the piston 44 is fully raised against the force of the spring 52 while allowing water to flow through the opening 46 in the side walls of the cylinder 45. This cycle is repeated as often as the timer 14 operates to momentarily close the solenoid valve 13.

It will be appreciated that, because the main shut off valve and the solenoid valve can be located below frost level in a pit adjacent to the tap to the main water line, the balance of the system including the vacuum breaker and the distributor valve may be located above frost line and in a convenient place some distance from the main line connection. Only one water line is required between the solenoid valve and the distributor valve and this line may include a drain device if desired. The timer may be set to determine any desired cycle and may be also adjusted for the amount of time each valve will be open, thereby enabling the user to control the amount of water applied to any particular lawn area.

The distributor valve of the present invention is insensitive to fluctuations in water pressure. Once the piston has been raised, it is held in the raised position by the pressure drop in the water flowing through the cylinder ports 46. This force is independent of the absolute pressure of the water, so that the distributor valve will not operate in response to the drop in water pressure such as often occurs when another tap is opened on the same water line. This is particularly important in residential installations where toilets, showers, sinks, washing machines, dish washers, and the like are in use while the sprinkling system is in operation.

I claim:

1. For use in a lawn sprinkling system including a water supply line having a timer-controlled solenoid-operated shut-off valve therein, and a plurality of groups of sprinkler heads, each group of which is served by a water outlet line, an automatic distributor valve mechanism for directing the flow of water from said supply line to each of said outlet lines in a predetermined sequence, said mechanism comprising, in combination, a base having a plurality of longitudinally aligned outlet ports connected to said water outlet lines and an inlet port connected to said water supply line, a housing sealed on said base and defining therewith a water chamber, means on said base defining a cylinder communicating with said inlet port and having an outlet port opening into said water chamber, a piston slidably positioned in said cylinder, a stem on said piston extending through said cylinder into said chamber, a plurality of valves mounted on said base within said chamber for closing each of said outlet ports, means in said chamber for biasing each of said valves to the closed position, a valve operator in said chamber comprising a shaft having a plurality of cams thereon for operatively engaging corresponding ones of said valves to open the same, a ratchet wheel fixed on said shaft, a ratchet dog on the end of said piston stem in said chamber, and spring means within said cylinder for biasing said piston inwardly of said cylinder towards the water inlet port, whereby the flow of water into said chamber through said cylinder forcibly moves said piston against the force of said spring to position said dog in ratchet engaging position so that when a flow of water through the main inlet line is shut off by said timer operated solenoid valve the piston spring urges said piston into the cylinder and thereby causes said dog to engage the ratchet to rotate the cam shaft and open a successive outlet valve and thereby change the flow of water to a different group of sprinkler heads.

2. For use in a lawn sprinkling system including a water supply line having a timer-controlled solenoid-operated shut-off valve therein, and a plurality of groups of sprinkler heads, each group of which is served by a water outlet line, an automatic distributor valve mechanism for directing the flow of water from said supply line to each of said outlet lines in a pre-determined sequence, said mechanism comprising, in combination, a base having a plurality of outlet ports connected to said water outlet lines and an inlet port connected to said water supply line, a housing sealed on said base and defining therewith a water chamber, means on said base defining a cylinder communicating with said inlet port and having an outlet port opening into said water chamber, a piston slidably positioned in said cylinder, a stem on said piston extending through said cylinder into said chamber, spring means within said cylinder for biasing said piston inwardly of said cylinder towards said water inlet port, a plurality of valve members mounted on said base within said chamber for closing each of said outlet ports, each of said valve members including a cam engaging arm, means in said chamber for biasing each of said valve members to the closed position, a shaft mounted for rotation on said base within said chamber, a plurality of cams fixed on said shaft for engaging corresponding ones of said cam engaging arms on said valves, a ratchet wheel fixed on said shaft, and dog means on said piston stem for operatively engaging said ratchet wheel to rotate said shaft for sequentially actuating said valve members to open the same in response to the action of the flow of water into said chamber through said cylinder to forcibly move said piston against the force of said spring and the subsequent shut-off of said flow of water through the main inlet line by said timer operated solenoid valve so that said piston spring moves said piston into said cylinder, and thereby sequentially change the flow of water to different groups of sprinkler heads.

References Cited

UNITED STATES PATENTS

| | | | |
|---|---|---|---|
| 1,606,245 | 11/1926 | Lang | 239—66 |
| 2,000,367 | 5/1935 | Williamson et al. | 239—66 |
| 2,393,091 | 1/1946 | Lacy-Mulhall | 239—66 |
| 3,027,094 | 3/1962 | Phillips | 239—66 |
| 3,063,643 | 11/1962 | Roberts | 239—66 |
| 3,118,606 | 1/1964 | Rotonda | 239—70 |

EVERITT W. KIRBY, Primary Examiner

U.S. Cl. X.R.

137—118, 624.13